United States Patent
Leblanc et al.

(10) Patent No.: US 8,420,158 B2
(45) Date of Patent: Apr. 16, 2013

(54) PROCESS FOR MAKING ELECTRODES FOR LITHIUM BASED ELECTROCHEMICAL CELLS

(75) Inventors: Patrick Leblanc, Boucherville (CA); Frederic Cotton, Montreal (CA); Dave Lessard, Montreal (CA); Alain Vallee, Varennes (CA)

(73) Assignee: Bathium Canada Inc., Boucherville, Quebec ( * ) Notice: Subject to any disclaimer, the term of this patent is extended or adjusted under 35 U.S.C. 154(b) by 450 days.

(21) Appl. No.: 12/399,648

(22) Filed: Mar. 6, 2009

(65) Prior Publication Data
US 2009/0226636 A1  Sep. 10, 2009

Related U.S. Application Data

(63) Continuation-in-part of application No. 12/044,612, filed on Mar. 7, 2008, now Pat. No. 8,147,916.

(51) Int. Cl.
B05D 5/12 (2006.01)

(52) U.S. Cl.
USPC .......................................................... 427/77

(58) Field of Classification Search ...................... 427/77
See application file for complete search history.

(56) References Cited

U.S. PATENT DOCUMENTS

| | | | |
|---|---|---|---|
| 3,984,637 A | 10/1976 | Caudill et al. | |
| 5,365,704 A | 11/1994 | Ray | |
| 6,116,757 A | 9/2000 | Simon | |
| 6,202,361 B1 | 3/2001 | Thorp et al. | |
| 6,205,716 B1 | 3/2001 | Peltz | |
| 2002/0073632 A1 | 6/2002 | Huffman | |
| 2003/0215710 A1* | 11/2003 | Lavoie et al. | 429/212 |
| 2004/0101752 A1 | 5/2004 | Oosawa et al. | |
| 2004/0115534 A1 | 6/2004 | Park et al. | |
| 2005/0037262 A1* | 2/2005 | Vallee et al. | 429/217 |

(Continued)

FOREIGN PATENT DOCUMENTS

| | | |
|---|---|---|
| EP | 1548861 A1 | 6/2005 |
| JP | 2006244801 A2 | 9/2006 |
| JP | 2006294457 A2 | 10/2006 |
| JP | 2007214027 A2 | 8/2007 |

OTHER PUBLICATIONS

Rubber Extrusion Theory and Development, B.G. Crowther, RAPRA, vol. 9, No. 9, 1998.*

(Continued)

Primary Examiner — Katherine A Bareford
Assistant Examiner — James M Mellott
(74) Attorney, Agent, or Firm — McMillan LLP

(57) ABSTRACT

A process for making an electrode sheet for lithium electrochemical cells is disclosed. The process comprises the steps of: a) admixing a polyether polymer or copolymer soluble in water, at least one lithium salt, at least one electrochemically active material, water and an organic solvent miscible with water in a water/organic solvent ratio of a maximum of 50% organic solvent by volume to form a water-based solution/suspension containing by weight at least 20% active electrode material, at least 5% of a polyether polymer or copolymer, and at least 1.5% lithium salt; b) coating the water-based solution/suspension in the form of an electrode thin film onto an electrode support; and, c) drying the electrode thin film to obtain an electrode thin sheet having less than 1000 ppm of residual water.

33 Claims, 6 Drawing Sheets

U.S. PATENT DOCUMENTS

| | | | |
|---|---|---|---|
| 2005/0196673 | A1 | 9/2005 | Biensan et al. |
| 2006/0127767 | A1 | 6/2006 | Gauthier et al. |
| 2006/0166093 | A1* | 7/2006 | Zaghib et al. ............... 429/217 |
| 2006/0211837 | A1* | 9/2006 | Ko et al. ..................... 528/35 |
| 2006/0222952 | A1* | 10/2006 | Kono et al. ............. 429/231.95 |

OTHER PUBLICATIONS

International Search Report dated Dec. 13, 2007 (Ten (10) pages).

International Search Report of Application No. PCT/CA2009/000294; Jun. 23, 2009; Kargina, Irina.

English Abstract of Japanese Application No. JP2006244801.

On-Line Machine-Generated English Translation of Japanese Application No. JP2006294457.

English Abstract of Japanese Application No. JP2007214027.

English Abstract of European Application No. EP1548861.

* cited by examiner

MIXING WATER, ORGANIC SOLVENT AND POLYETHER POLYMER TO FORM A WATER-BASED SOLUTION

DISSOLVING LITHIUM SALT INTO THE WATER-BASED SOLUTION

DISPERSING ELECTROCHEMICALLY ACTIVE MATERIAL AND OPTIONALLY ELECTRONICALLY CONDUCTIVE ADDITIVE INTO THE WATER-BASED SOLUTION

COATING ELECTRODE SLURRY ONTO A CURRENT COLLECTOR SUBSTRATE

DRYING ELECTROD FILM TO EXTRACT WATER AND ORGANIC SOLVENT

FIG. 5

PROCESS FOR MAKING ELECTRODES FOR LITHIUM BASED ELECTROCHEMICAL CELLS

CROSS-REFERENCE

The present application is a Continuation-In-Part of U.S. patent application Ser. No. 12/044,612 filed on Mar. 7, 2008, now U.S. Pat. No. 8,147,916, the entirety of which is incorporated herein by reference.

FIELD OF THE INVENTION

The present invention relates to a process for making electrodes for lithium based electrochemical cells.

BACKGROUND OF THE INVENTION

Processes for making thin sheets of positive electrodes for lithium ion type electrochemical cells typically consist of mixing active electrode material which is usually in powder form with an electrically conductive material such as carbon or graphite particles and a polymer binder into an organic solvent which is then blended into a homogenized electrode slurry. The electrode slurry is thereafter coated on a current collector sheet in the form of a thin layer or film and the organic solvent is removed from the thin film by heating the thin film to evaporate the solvent. The resulting dried positive electrode thin sheet is typically porous and contains no electrolyte. The dried positive electrode thin sheet is assembled with a separator and a counterpart negative electrode and the assembly is saturated with an ionically conductive liquid electrolyte comprising a lithium salt dissolved therein to form a lithium ion electrochemical cell. The porous positive electrode is filled with the electrolyte to ensure the ionic exchange between the positive and negative electrodes.

When producing large batches or in a continuous process, the large quantity of evaporated solvent which may exceed environmental guide lines may have to be recovered to avoid environmental contamination and the recovery process requires special installations to prevent the solvent in gaseous form from escaping into the environment, and specialty equipments for handling and storing the used solvent which must then be disposed of, or re-used.

Other coating processes for making thin sheets of positive electrode material for solid type lithium based electrochemical cells incorporate into the electrode mixture an electrolyte consisting of a lithium salt solvating polymer and a lithium salt which acts as a binder as well as an electrolyte. The mixture of positive electrode which comprises an active electrode material, an electrically conductive material, a solvating polymer and a lithium salt is blended together with an organic solvent into a homogenized electrode slurry. The electrode slurry is thereafter coated on a current collector sheet in the form of a thin layer or film and the organic solvent is removed from the thin film by heating the thin film to evaporate the solvent. The positive electrode thin sheet thereby produced has little porosity since the electrolyte is already in the electrode and fills the space between the active electrode particles. The positive electrode thin sheet is then assembled with a solid ionically conductive electrolyte sheet consisting of the same or a different polymer and the lithium salt and a counterpart negative electrode to form a lithium based electrochemical cell.

In both cases, the amount of organic solvents is adjusted for diluting the electrode mixture sufficiently in order to lower its viscosity such that the electrode mixture can be spread into thin layers. In both cases, the organic solvents must be removed prior to assembly with the electrolyte separator and the negative electrode to form an electrochemical cell. When producing in large batches or in a continuous process, the organic solvent may have to be recovered and/or treated to avoid discharge into the environment in gaseous form.

US patent application US2006/0166093 discloses a process of making positive and/or negative electrode material in which the processing solvent is water. The disclosed process utilizes a so-called water soluble synthetic rubber (SBR) mixed with a thickening agent as the electrode binder. An aqueous solution adapted for spreading is prepared which include an electrochemically active material, a water soluble synthetic rubber, a thickening agent, optionally an electronically conductive material, and water as the solvent. The aqueous solution of electrode material does not contain lithium salt as the latter is known for its hygroscopic properties which would make it very difficult to dry the electrode after it has been spread into film form in order to remove the water. The film is dried for an extensive period of time (12-24 hours) to reduce the water contain to below 2000 ppm and most preferably below 50 ppm. The electrode sheet produced is porous in order to allow infiltration of a liquid or gelled electrolyte including a lithium salt to provide an ionically conductive path to the particles of electrochemically active material in the electrode. The process disclosed for making an electrode is therefore a two-step process in which the constituents of the electrode excluding the electrolyte are first mixed in water and dried and when the basic electrode is dried, the electrolyte including lithium salt is added to form a working electrode. The process disclosed is therefore specific to lithium ion type electrochemical cells and is not adapted for production of lithium based electrochemical cells having a solid electrolyte which requires that the lithium salt be incorporated in the positive electrode prior to assembly into electrochemical cells.

Thus, there is a need for a method and a process for making electrodes incorporating its ionically conductive electrolyte for lithium based electrochemical cells which is cost effective and environmentally friendly.

STATEMENT OF THE INVENTION

One aspect of the present invention is to provide a process for making for making an electrode sheet for a lithium electrochemical cells comprising the steps of: a) admixing a polyether polymer or copolymer soluble in water, at least one lithium salt, at least one electrochemically active material, water and an organic solvent miscible with water, the organic solvent being at a maximum of 50% organic solvent by volume to form a water-based solution/suspension containing by weight at least 20% active electrode material, at least 5% of a polyether polymer or copolymer, and at least 1.5% lithium salt; b) coating the water-based solution/suspension in the form of an electrode thin film onto an electrode support; and, c) drying the electrode thin film to obtain an electrode thin sheet having less than 1000 ppm of residual water.

Another aspect of the present invention provides that the organic solvent is preferably mixed with the water in a ratio of a maximum of 25% of organic solvent.

Another aspect of the present invention provides that the electrode thin sheet has less than 10% porosity after being dried.

Another aspect of the present invention provides admixing up to 10% electrically conductive material into the water-based solution/suspension.

An additional aspect of the invention provides that the organic solvent is selected from the group consisting of an alcohol, a mixture of alcohols, a ketone, a mixture of ketones, a mixture of alcohol and ketone and a mixture of alcohols and ketones.

Another aspect of the present invention provides admixing an antifoaming agent into the water-based solution/suspension.

An additional aspect of the invention provides admixing an electrically conductive material into the water-based solution/suspension.

Another aspect of the present invention provides that the electrode thin film is dried by thermal convection, thermal conduction and/or thermal radiation drying process carried out through multiple incremental temperature stages.

An additional aspect of the invention provides the electrode thin film travels through a dryer/oven consisting of a tunnel having incremental temperature zones ranging from 50° C. to 200° C.

A further aspect of the present invention provides that the drying step is carried out under a nitrogen gas sweep at the surface of the electrode thin film.

An additional aspect of the invention provides that the polyether polymer or copolymer is capable of solvating a lithium salt.

An additional aspect of the invention provides that the polyether polymer or copolymer is cross-linkable.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects and advantages of the embodiments of the present invention will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where:

FIG. 5 is a flowchart illustrating a process method for preparing a thin film positive electrode for use in a lithium based electrochemical cell in accordance with a fifth embodiment of the present invention.

DESCRIPTION OF PREFERRED
EMBODIMENT(S)

All lithium salts are generally acknowledged as hygroscopic materials having the ability to attract and bind water molecules. Contemplating the use of water as the solvent to mix the constituent elements of an electrode which includes the electrolyte (with a lithium salt) is considered by the electrochemical scientific community as ill advised because of the hygroscopic nature of lithium salts and the difficulties it raises in extracting all traces of water once the electrode has been spread onto a substrate in the form of a thin film considering that small amounts of residual water in the thin sheet of electrode will drastically affect the capacity of the electrochemical cell as well as its ability to cycle.

As will be described in details further down, one embodiment of the process involves dissolving a lithium salt into water. Lithium salts such as LiTFSI, TFSI, FSI, BETI, LiBOB, $LiBF_4$, and $LiClO_4$ can be used in the present process using water as a solvent. Lithium salts, like most salts are generally acknowledged as hygroscopic materials having the ability to attract and hold water molecules. The use of water as the solvent to mix the constituent elements of an electrode which includes lithium salts for producing electrode thin sheets raises the difficulty of extracting all traces of water once the electrode has been spread onto a substrate in the form of a film. Indeed, Lithium salts have a tendency to bind with water molecules and to form hydrated salt molecules. The water molecules are therefore difficult to remove once these hydrated salt molecules are formed and as previously mentioned, even small amounts of water molecules left in the electrode material will drastically affect the overall capacity of the electrochemical cells being manufactured as well as their ability to cycle.

However, the inventors have unexpectedly discovered that lithium salts and particularly LiTFSI can be processed, along with the other constituents of an electrode, in water and that the water molecules can be extracted from the electrode at the end of the process. Distilled, purified or deionised water is preferably used to avoid contamination.

Figure 1:
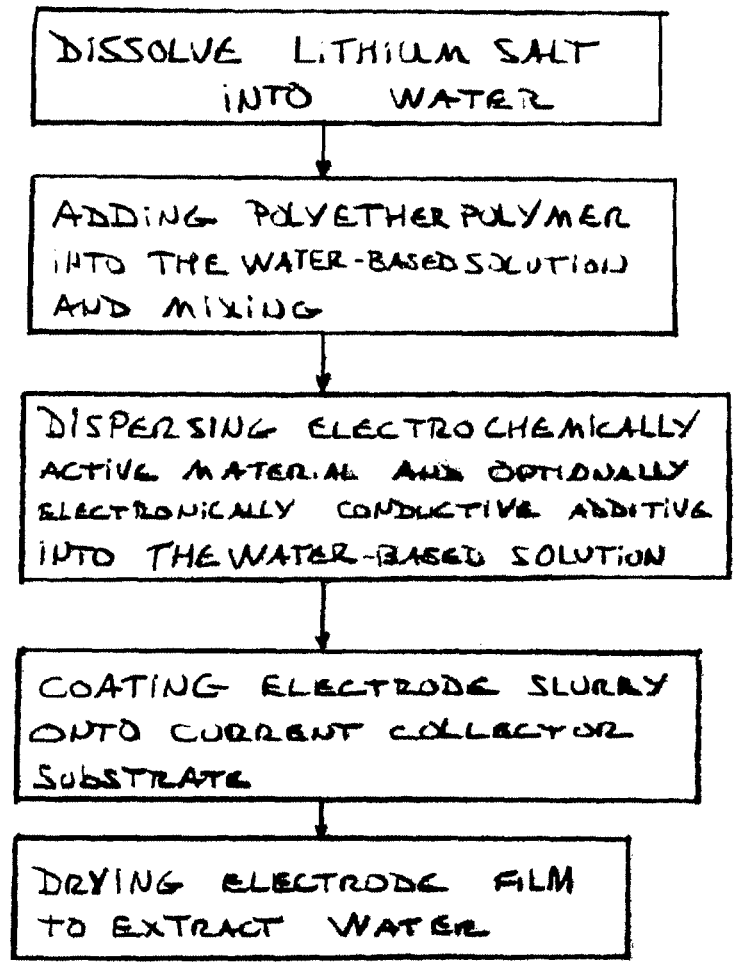
FIG. 1 is a flowchart illustrating a process method for preparing a thin film positive electrode for use in a lithium based electrochemical cell in accordance with one embodiment of the present invention.

FIG. 1 is a flowchart illustrating a process for preparing an electrode sheet in accordance with one embodiment of the present invention. First, a lithium salt such as LiTFSI is dissolved into water at a proper ratio for a desired composition. The lithium salt is dissolved in water using a standard mechanical mixer to ensure complete dissolution of the lithium salt in the water. The amount of water is as much as necessary to dissolve the lithium salt completely. Since the water is evaporated at the end of the process, there is no restriction on the amount of water used however, for economical reason related to the efficiency of the drying process, it is better to reduce the amount of water used to the minimum. The amount of water used should be enough to dissolve the lithium salt and the solvating polyether polymer or copolymer added to the solution of water-lithium salt in the subsequent step of the process. Also, the amount of water should be in a range that insures a good theological behaviour to the water-based solution/suspension after the addition of the electrochemically active material and the electrically conductive material in order to form a paste that will be readily spread in the form of a thin film.

Subsequently, a polyether polymer or copolymer capable of solvating the lithium salt, preferably a polyethylene oxide polymer or co-polymer is introduced into the water-based solution including the lithium salt. Polyethylene oxide is one example of a polyether polymer capable of solvating a lithium salt such that when water is removed at the end of the process, the polyethylene oxide matrix with the lithium salt dissolved therein serves as the electrolyte component of the electrode as well as its binder. Once dried, the solid electrolyte serves as binder for the materials of the electrode and ensures ionic transport through the electrode. The new interim water-based solution including the lithium salt and polyethylene oxide is mechanically mixed until a homogeneous water-based solution is obtained.

The polyether polymer may be cross-linkable. The use of a cross-linkable polyether polymer enables to utilize a polymer of lower molecular weight, which facilitates the mixing and blending of the electrode components and increase the mechanical properties of the electrode. The polymer matrix may also contain at least one cross-linking additive in order to increase the dimensional stability of the formed electrode. The cross-linking additive is selected from trimethylolpropane, trimethacrylate, polyethylene oxide diacrylate, polyethylene oxide dimethacrylate, glycerol triacrylate, glycerol trimethacrylate, pentaerythiol tetraacrylate, glycerol propoxylate (1PO/OH) triacrylate, dipentaerythiol penta/hexaacrylate and di(trimethylolpropane) tetraacrylate. The matrix may also contain a cross-linking initiator. Cross-linking of the polymer matrix is carried out thermally, by UV radiation or with an electron beam (EB).

An antifoaming agent (silicone based or non-silicone based) may be added to the water-based solution either before or after the introduction of the polyethylene oxide in order to prevent foam build-up at the surface of the water-based solution or gas bubbles formation in the bulk of the water-based solution during mixing. The antifoaming agent is preferably selected from the group consisting of: polydimethylsiloxane, 10% to 100% Silicone Antifoam compound, Acidified Silicone Antifoam, Non-silicone Antifoam Emulsion, Co-Polymer Defoamer, Fatty Alcohol Defoamer, Vegetable Oil-Based Defoamer, 2-ethylhexanol (EH), tributyl phosphate (TBP), and tetrabutylammonium chloride (TBAC).

As an additional or alternative measure to prevent foaming, the mixing process may be carried out under vacuum in order to limit air contact with the water-based solution during mixing thereby preventing or limiting foam build-up at the surface of the water-based solution or gas bubbles formation in the bulk of the aqueous solution during mixing.

Thereafter, the electrochemically active material and, if required an electronically conductive additive, is introduced into the water-based solution including the lithium salt and the polyethylene oxide and the new mixture is mechanically mixed under vacuum until a homogeneous degassed water-based solution/suspension in the form of a slurry is obtained. The electrochemically active material is generally in the form of powders and is preferably selected from electrochemically active materials having the general formulas of $LiFePO_4$, $LiCoO_2$, $LiNiO_2$, $LiMn_2O_4$, and $Li_4Ti_5O_{12}$, and all their derivatives. All these electrochemically active materials may of course have a nanometric structure.

The electronically conductive additive is typically selected from the group consisting of carbon, carbon black, graphite and cokes. Electronically conductive additive may not be required when the electrochemically active material used in the electrode exhibits sufficient electronic surface conductivity. However, even then, electronically conductive additive may be added depending on the end product (electrochemical cell) cycling requirements.

In general terms, the water-based solution/suspension contains by weight at least 40% water, at least 20% electrochemically active material, up to 10% electrically conductive material if required, at least 5% polyethylene oxide polymer or copolymer, and at least 1.5% lithium salt.

After mixing (under vacuum and/or with antifoaming agent added), a homogeneous slurry is obtained which is ready to be formed into a thin film. The homogeneous slurry is preferably spread or coated directly onto a current collector substrate. An aluminium based current collector substrate is typically used for the positive electrode and a copper based current collector substrate is typically used for the negative electrode. The spreading or coating of the homogeneous slurry is preferably carried out via Doctor blade, reverse roll, gravure roll, curtain, slide die, or slot die processes. The slurry may also be heated prior to coating to reduce its viscosity. The coated electrode thin film preferably has a thickness of less than 100 μm and preferably less than 70 μm.

Thereafter, the current collector substrate coated with the electrode slurry is passed through a dryer/oven in order to remove the water from the coated electrode slurry to form the electrode thin sheet having less than 1000 ppm of residual water. Preferably, the dryer/oven consists of floatation tunnel having incremental drying zones in which heated gas set at a specific temperature and flow rate dries the electrode thin film. As it travels through the dryer/oven tunnel, the current collector substrate coated with the electrode thin film is suspended in mid air by the moving heated gases such that it is said to float. Water is removed from the electrode thin film by thermal convection, conduction and/or radiation. For example, the dryer/oven tunnel includes five (5) drying zones. In each drying zone, the temperature and velocity of the heated gas is specifically set to remove the maximum amount of water left in the electrode thin film without affecting the surface quality of the film; each one of these zones removing more and more water until the electrode thin film is dry and substantially all traces of water have been removed such that the final electrode thin sheet contains less than 1000 ppm of water and more preferably less than 600 ppm of water. The temperature and the velocity of the impingement gas of each zone are set to optimise the drying process at a given speed of the film through the dryer/oven tunnel and to insure a good quality of the electrode surface. There may be more or less drying zones in the dryer/oven tunnel depending on its length and the temperature steps desired.

As a further example, each of the drying zones may have the same heated gas velocity while the temperature of the heated gases increase in steps through each drying zones. The dryer/oven tunnel includes multiple temperature zones such that the current collector substrate coated with the thin film of electrode material goes through multiple stages of temperature ranging from 50° C. to 200° C. in a continuous process. Each one of these zones removing more and more water until the electrode thin film is dry and substantially all traces of water have been removed.

The length of the dryer/oven tunnel as well as the length of time the current collector and electrode assembly is heated through the various temperature/velocity stages of the dryer/oven tunnel is relative to the speed of the current collector and electrode assembly through the dryer/oven tunnel, the thickness of the film and the initial proportion of water in the electrode slurry.

The removal of the water present in the electrode film is also preferably carried out under a nitrogen gas sweep at the surface of the electrode in order to avoid formations of species through reactions of some constituent elements of the electrode with ambient air.

When the polyether polymer or copolymer used in the electrode is cross-linkable and/or contains a cross-linking additive, cross-linking of the polymer matrix occurs through the sequential heat stages of the drying process or in a subsequent process step.

Various techniques known to one skilled in the art can be used to remove the traces of water that are present in the electrode, after coating of the latter. These traces of water are removed by thermal means on line of the EXT, DBH and/or DB process, or by infra red at a temperature advantageously between 50° C. and 200° C.

Because the electrode thin sheet produced by the above process contains all the constituent elements of a working electrode and more specifically the ionically conductive electrolyte consisting of the solvating polymer matrix containing the lithium salt, the resulting electrode thin sheet has less than 10% porosity and preferably less than 5% after being dried and the water removed. The resulting electrode thin sheet is solid yet flexible and is an operational electrode.

The process described above therefore enables one to produce a working electrode using water as a solvent by mixing all the constituent elements including the ionically conductive electrolyte comprising a lithium salt prior to assembling the working electrode into an electrochemical cell as opposed to prior art processes in which the basic constituent elements of the electrode (excluding the ionically conductive electrolyte comprising lithium salt) are mixed, dried and assembled into an electrochemical cell and thereafter, an ionically conductive electrolyte comprising a lithium salt is introduced in the electrode to complete the formation of a working electrode and the electrochemical cell.

Figure 2:
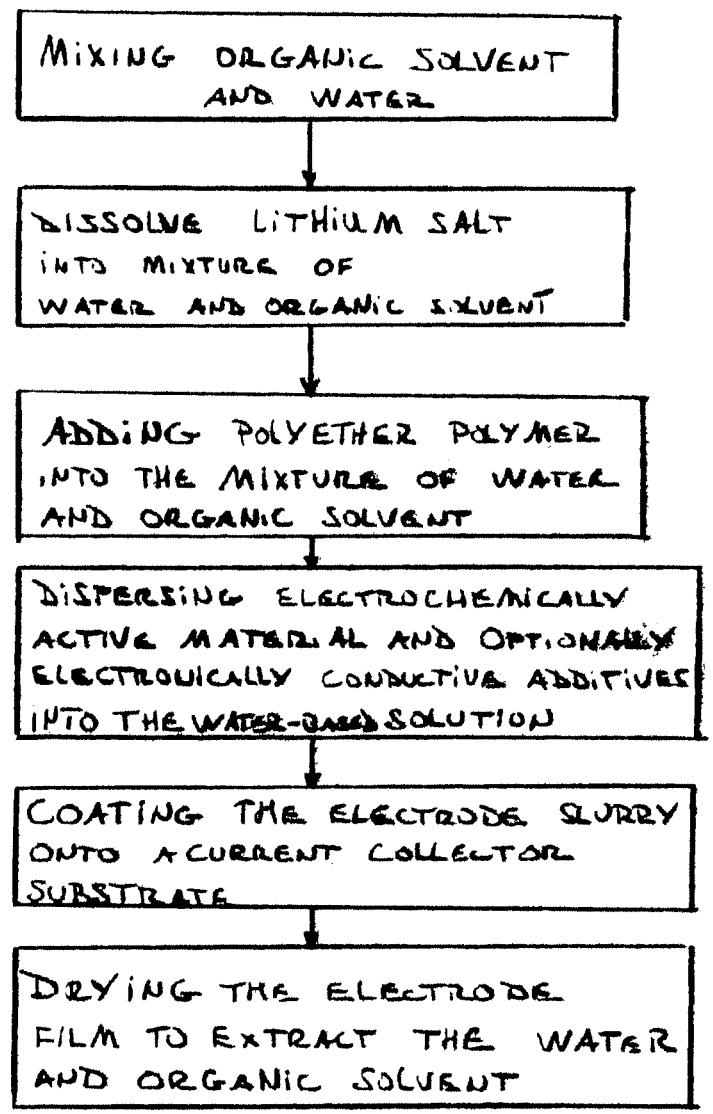
FIG. 2 is a flowchart illustrating a process method for preparing a thin film positive electrode for use in a lithium based electrochemical cell in accordance with a second embodiment of the present invention.

FIG. 2 is a flowchart illustrating a process for preparing an electrode thin sheet in accordance with a second embodiment of the present invention. First, an organic solvent miscible with water is mixed with water in a ratio of a maximum of 50% organic solvent by volume. Preferred organic solvents are alcohols, mixtures of alcohols, ketones, mixtures of ketones, mixtures of alcohol and ketone and mixtures of alcohols and ketones. Preferred alcohols are ethanol, methanol or isopropanol. Preferred ketones are acetone and methyl ethyl ketone (MEK).

In a preferred embodiment, the organic solvent is mixed with water in a ratio of between 5% and 25% of organic solvent with between 95% and 75% water by volume. The portion of organic solvent is added to water in order to increase the solubility of the polyether polymer or copolymer in the solvent mix (organic solvent and water) to be added in the third step of the process shown in FIG. 2. The organic solvent has the effect of increasing the Low Critical Solubility Temperature (LCST) of the polymer thereby improving the ease of mixing and processing the constituents of the electrode slurry.

Next, a lithium salt such as LiTFSI is dissolved into the solvent mix at a proper ratio for a desired composition. The lithium salt is dissolved in the solvent mix using a standard mechanical mixer to ensure complete dissolution of the lithium salt in the solvent mix. The amount of solvent mix is as much as necessary to dissolve the lithium salt completely. Since the solvent mix is evaporated at the end of the process, there is no restriction on the amount of solvent mix used however, for economical reason related to the efficiency of the drying process and to limit the amount of organic solvent evaporated to a minimum to avoid environmental contamination and the recovery process that it may entail, it is better to reduce the amount of solvent mix used to the minimum. The amount of solvent mix used should be enough to dissolve the lithium salt and disperse the polyether polymer added to the solution in the third step of the process. Also, the amount of solvent mix should be in a range that insures a good theological behaviour to the aqueous solution/suspension after the addition of the electrochemically active material and the electrically conductive material in order to form a paste that will be readily spread in the form of a thin film.

Subsequently, a polyether polymer or copolymer capable of solvating a lithium salt, preferably a polyethylene oxide polymer or co-polymer is introduced into the water-based solution including the lithium salt. Polyethylene oxide is one example of a polyether polymer capable of solvating lithium salt such that when water and organic solvent are removed by evaporation, the polyethylene oxide matrix with the lithium salt dissolved therein serves as the electrolyte component of the electrode. Once dried, the solid electrolyte serves as binder for the materials of the electrode and ensures ionic transport through the electrode. The new interim water-based solution including the lithium salt and polyethylene oxide is mechanically mixed until a homogeneous water-based solution is obtained.

The polyether polymer may be cross-linkable. The use of a cross-linkable polyether polymer enables to utilize a polymer of lower molecular weight, which facilitates the mixing and blending of the electrode components. The polymer matrix may also contain at least one cross-linking additive in order to increase the dimensional stability of the formed electrode. The cross-linking additive is selected from the additives enumerated above relative to FIG. 1. Cross-linking of the polymer matrix is carried out thermally, by UV radiation or with an electron beam (EB).

To prevent foaming, an antifoaming agent (silicone based or non-silicone based) may be added as described above and the mixing process may be carried out under vacuum in order to limit air contact with the solution during mixing.

Thereafter, the electrochemically active material and, if required an electronically conductive additive, is introduced into the water-based solution now including the solvent mix, the lithium salt and the polyethylene oxide and the new mixture is mechanically mixed under vacuum until a homogeneous degassed final water-based solution/suspension in the form of a slurry is obtained. The electrochemically active materials used are described above with reference to FIG. 1.

In general terms, the electrode slurry mixture contains by weight at least 40% water-based solvent mix, at least 20% electrochemically active material, up to 10% electrically conductive material if required, at least 5% polyether polymer or copolymer, and at least 1.5% lithium salt.

After mixing (under vacuum and/or with antifoaming agent added), a homogeneous water-based solution/suspension slurry is obtained which is ready to be formed into a thin film. The homogeneous slurry is preferably spread or coated directly onto a current collector substrate. An aluminium based current collector substrate is typically used for the positive electrode and a copper based current collector substrate is typically used for the negative electrode. The spreading or coating of the homogeneous slurry is preferably carried out via Doctor blade, reverse roll, gravure roll, curtain, slide die, or slot die processes. The slurry may also be heated prior to coating to reduce its viscosity. The coated electrode thin film preferably has a thickness of less than 100 µm and preferably less than 70 µm.

Thereafter, the current collector substrate coated with the electrode thin film is carried through a dryer/oven to remove the water and organic solvent from the coated electrode film as described relative to FIG. 1 in order to form an electrode sheet.

Figure 3:
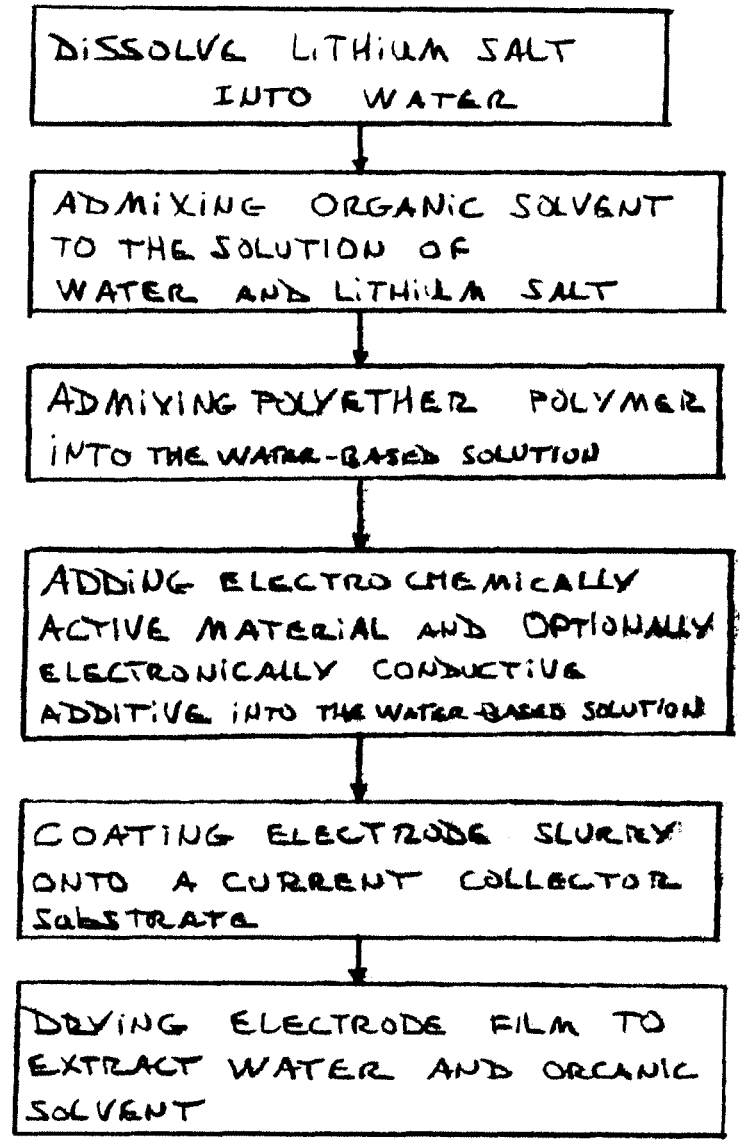
FIG. 3 is a flowchart illustrating a process method for preparing a thin film positive electrode for use in a lithium based electrochemical cell in accordance with a third embodiment of the present invention.

FIG. 3 is a flowchart illustrating a process for preparing an electrode thin sheet in accordance with a third embodiment of the present invention. First, a lithium salt is dissolved into water at a proper ratio for a desired composition. The lithium salt is dissolved in water using a standard mechanical mixer to ensure complete dissolution of the lithium salt in the water. The amount of water is as much as necessary to dissolve the lithium salt completely. Since the water is evaporated at the end of the process, there is no restriction on the amount of purified water used however, for economical reason related to the efficiency of the drying process, it is better to reduce the amount of water used to the minimum.

Subsequently, an organic solvent miscible with water is mixed with the solution of water and lithium salt in a ratio of a maximum of 50% organic solvent by volume. Preferred organic solvents are alcohols, mixtures of alcohols, ketones, mixtures of ketones, mixtures of alcohol and ketone and mixtures of alcohols and ketones. Preferred alcohols are ethanol, methanol or isopropanol. Preferred ketones are acetone and methyl ethyl ketone (MEK). In a preferred embodiment, the organic solvent is mixed into the solution in a ratio of between 5% and 25% of organic solvent to between 95% and 75% of water by volume. The portion of organic solvent is added to the solution of water and lithium salt in order to increase the solubility of the polyether polymer in the solution to be added in the third step of the process shown in FIG. 3. The organic solvent has the effect of increasing the Low Critical Solubility Temperature (LCST) of the polymer thereby improving the ease of mixing and processing the constituents of the electrode and the resulting electrode slurry.

Thereafter, a polyether polymer or copolymer capable of solvating a lithium salt, preferably a polyethylene oxide polymer or co-polymer is introduced into the water-based solution including the organic solvent and the lithium salt. Polyethylene oxide is one example of a polyether polymer capable of solvating lithium salt such that when the solvents are removed at the end of the process, the polyethylene oxide matrix with the LiTFSI salt dissolved therein serves as the electrolyte component of the electrode. Once dried, the solid electrolyte serves as binder for the electrochemically active materials of the electrode and ensures ionic transport through the electrode. The new interim water-based solution including the lithium salt and polyethylene oxide is mechanically mixed until a homogeneous solution is obtained.

The polyether polymer may be cross-linkable and a cross-linking additive may be used as described above in order to increase the dimensional stability of the formed electrode. The cross-linking additive is selected from the additives enumerated above relative to FIG. 1. Cross-linking of the polymer matrix is carried out thermally, by UV radiation or with an electron beam (EB).

To prevent foaming, an antifoaming agent (silicone based or non-silicone based) may be added as described above and the mixing process may be carried out under vacuum in order to limit air contact with the solution during mixing.

Thereafter, the electrochemically active material and, if required an electronically conductive additive, is introduced into the water-based solution now including the solvent mix, the lithium salt and the polyethylene oxide, and the new mixture is mechanically mixed under vacuum until a homogeneous degassed final water-based solution/suspension in the form of a slurry is obtained. The electrochemically active materials used are described above with reference to FIG. 1.

In general terms, the slurry mixture contains by weight at least 40% solvent mix, at least 20% electrochemically active material, up to 10% electrically conductive material if required, at least 5% polyether polymer or copolymer, and at least 1.5% lithium salt.

After mixing (under vacuum and/or with antifoaming agent added), a homogeneous electrode slurry is obtained which is ready to be formed into a thin film. The homogeneous slurry is preferably spread or coated directly onto a current collector substrate. An aluminium based current collector substrate is typically used for the positive electrode and a copper based current collector substrate is typically used for the negative electrode. The spreading or coating of the homogeneous slurry is preferably carried out via Doctor blade, reverse roll, gravure roll, curtain, slide die, or slot die processes. The slurry may also be heated prior to coating to reduce its viscosity. The coated electrode thin film preferably has a thickness of less than 100 µm and preferably less than 70 µm.

Thereafter, the current collector substrate coated with the electrode slurry is carried through a dryer/oven to remove the water and organic solvent from the coated electrode slurry as described relative to FIG. 1 in order to form an electrode sheet.

Figure 4:
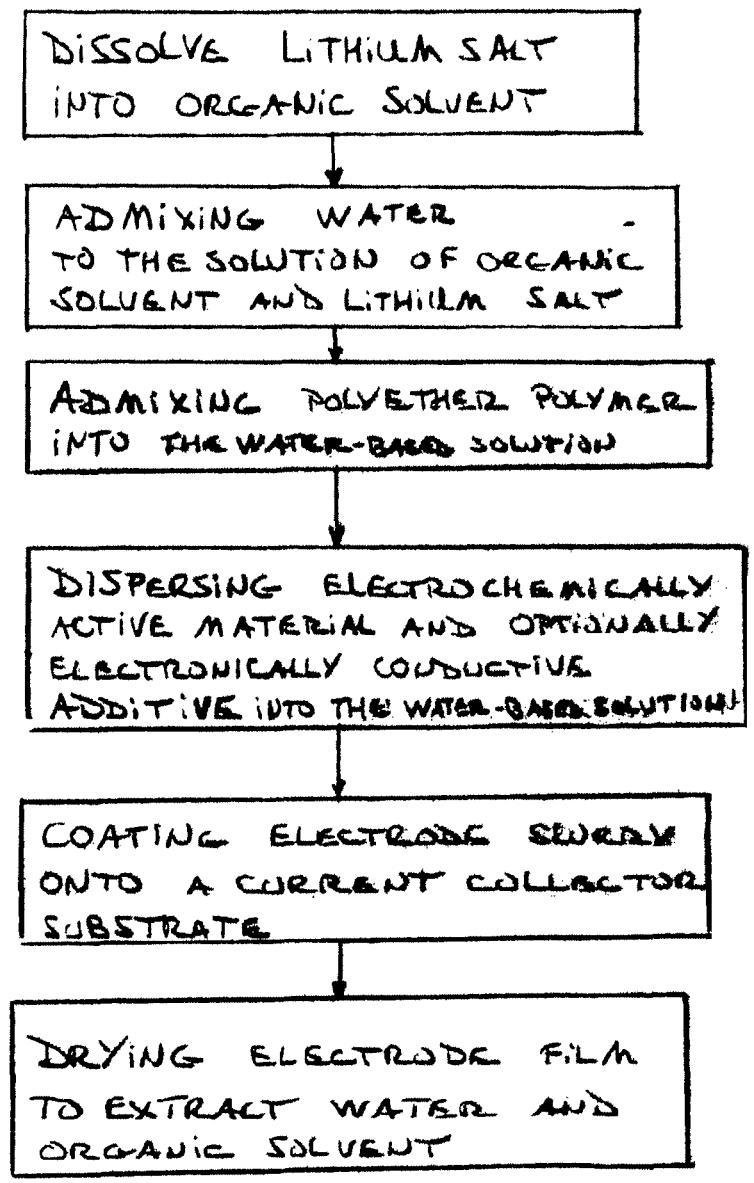
FIG. 4 is a flowchart illustrating a process method for preparing a thin film positive electrode for use in a lithium based electrochemical cell in accordance with a fourth embodiment of the present invention.

FIG. 4 is a flowchart illustrating a process for preparing an electrode thin sheet in accordance with a fourth embodiment of the present invention. First, a lithium salt is dissolved into an organic solvent which miscible with water. Preferred organic solvents are alcohols, mixtures of alcohols, ketones, mixtures of ketones, mixtures of alcohol and ketone and mixtures of alcohols and ketones. Preferred alcohols are ethanol, methanol or isopropanol. Preferred ketones are acetone and methyl ethyl ketone (MEK). The lithium salt is dissolved in the organic solvent using a standard mechanical mixer to ensure complete dissolution of the lithium salt in the organic solvent. The amount of organic solvent required is as much as necessary to dissolve the lithium salt completely. Since the organic solvent will be evaporated at the end of the process, there is no restriction on the amount of organic solvent used however, for economical reason related to the efficiency of the later drying process and to limit the amount of organic solvent evaporated to a minimum to avoid environmental contamination and the recovery process that it may entail, it is better to reduce the amount of organic solvent to the minimum.

Subsequently, water, preferably distilled, purified or deionised, is mixed with the solution of organic solvent and lithium salt in a ratio of a minimum of 50% water by volume. In a preferred embodiment, water is mixed into the solution in a ratio of between 75% and 95% of water to between 25% and 5% organic solvent by volume. The portion of organic solvent in the solution increases the solubility of the polyether polymer in the solution to be added in the third step of the process shown in FIG. 4. The organic solvent has the effect of increasing the Low Critical Solubility Temperature (LCST) of the polymer thereby improving the ease of mixing and processing the constituents of the electrode and the resulting electrode slurry.

Thereafter, a polyether polymer or copolymer capable of solvating a lithium salt, preferably a polyethylene oxide polymer or co-polymer is introduced into the water-based solution including water, organic solvent and lithium salt. Polyethylene oxide is one example of a polyether polymer capable of solvating lithium salt such that when the solvents are removed at the end of the process, the polyethylene oxide matrix with the lithium salt dissolved therein serves as the electrolyte component of the electrode. Once dried, the solid electrolyte serves as binder for the electrochemically active materials of the electrode and ensures ionic transport through the electrode. The new interim water-based solution including the lithium salt and polyethylene oxide is mechanically mixed until a homogeneous solution is obtained.

The polyether polymer may be cross-linkable and a cross-linking additive may be used as described above in order to increase the dimensional stability of the formed electrode. The cross-linking additive is selected from the additives enumerated above relative to FIG. 1. Cross-linking of the polymer matrix is carried out thermally, by UV radiation or with an electron beam (EB).

To prevent foaming, an antifoaming agent (silicone based or non-silicone based) may be added as described above and the mixing process may be carried out under vacuum in order to limit air contact with the water-based solution during mixing.

Thereafter, the electrochemically active material and, if required an electronically conductive additive, is introduced into the water-based solution now including the solvent mix, the lithium salt and the polyethylene oxide, and the new mixture is mechanically mixed under vacuum until a homogeneous degassed final water-based solution/suspension in the form of a slurry is obtained. The electrochemically active materials used are described above with reference to FIG. 1.

In general terms, the slurry mixture contains by weight at least 40% solvent (water and organic solvent), at least 20% electrochemically active material, up to 10% electrically conductive material if required, at least 5% polyether polymer or copolymer, and at least 1.5% lithium salt.

After mixing (under vacuum and/or with antifoaming agent added), a homogeneous electrode slurry is obtained which is ready to be formed into a thin film. The homogeneous slurry is preferably spread or coated directly onto a current collector substrate. An aluminum based current collector substrate is typically used for the positive electrode and a copper based current collector substrate is typically used for the negative electrode. The spreading or coating of the homogeneous slurry is preferably carried out via Doctor blade, reverse roll, gravure roll, curtain, slide die, or slot die processes. The slurry may also be heated prior to coating to reduce its viscosity. The coated electrode thin film preferably has a thickness of less than 100 μm and preferably less than 70 μm.

Thereafter, the current collector substrate coated with the electrode slurry is carried through a dryer/oven to remove the water and organic from the coated electrode slurry as described relative to FIG. 1 in order to form an electrode sheet.

FIG. 5 is a flowchart illustrating a process for preparing an electrode thin sheet in accordance with a fifth embodiment of the present invention. First, water is mixed an organic solvent which is miscible with water, and a polyether polymer or copolymer capable of solvating lithium salt, preferably a polyethylene oxide polymer or co-polymer to form a water-based solution. Preferred organic solvents are enumerated above with reference to FIG. 2. The water and organic solvent are mixed in a ratio of a minimum of 50% water by volume. In a preferred embodiment, the water and organic solvent are mixed in a ratio of between 75% and 95% water to between 25% and 5% organic solvent by volume. The polyether polymer is mixed with water and organic solvent in a ratio of 10% to 20% by weight.

The polyether polymer may be cross-linkable and a cross-linking additive may be used as described above in order to increase the dimensional stability of the formed electrode. The cross-linking additive is selected from the additives enumerated above relative to FIG. 1. Cross-linking of the polymer matrix is carried out thermally, by UV radiation or with an electron beam (EB). The portion of organic solvent in the solution increases the solubility of the polyether polymer in the solution. The organic solvent has the effect of increasing the Low Critical Solubility Temperature (LCST) of the polymer thereby improving the ease of mixing and processing the constituents of the electrode and the resulting electrode slurry.

A lithium salt is dissolved into the water-based solution using a standard mechanical mixer to ensure complete dissolution of the lithium salt in the water-based solution. The amount of organic solvent and water required is as much as necessary to dissolve the lithium salt completely. Since the water and organic solvent will be evaporated at the end of the process, there is no restriction on the amount of organic solvent used however, for economical reason related to the efficiency of the later drying process and to limit the amount of organic solvent evaporated to a minimum to avoid environmental contamination and the recovery process that it may entail, it is better to reduce the amount of organic solvent to the minimum. The new interim water-based solution including the lithium salt is mechanically mixed until a homogeneous solution is obtained.

To prevent foaming, an antifoaming agent (silicone based or non-silicone based) may be added as described above and the mixing process may be carried out under vacuum in order to limit air contact with the solution during mixing.

Thereafter, the electrochemically active material and, if required an electronically conductive additive, is introduced into the water-based solution now including the solvent mix (water and organic solvent), the lithium salt and the polyethylene oxide, and the new mixture is mechanically mixed under vacuum until a homogeneous degassed final water-based solution/suspension in the form of a slurry is obtained. The electrochemically active materials used are described above with reference to FIG. 1.

In general terms, the slurry mixture contains by weight at least 40% solvent (water and organic solvent), at least 20% electrochemically active material, up to 10% electrically conductive material if required, at least 5% polyether polymer or copolymer, and at least 1.5% lithium salt.

After mixing (under vacuum and/or with antifoaming agent added), a homogeneous electrode slurry is obtained which is ready to be formed into a thin film. The homogeneous slurry is preferably spread or coated directly onto a current collector substrate. An aluminum based current collector substrate is typically used for the positive electrode and a copper based current collector substrate is typically used for the negative electrode. The spreading or coating of the homogeneous slurry is preferably carried out via Doctor blade, reverse roll, gravure roll, curtain, slide die, or slot die processes. The slurry may also be heated prior to coating to reduce its viscosity. The coated electrode thin film preferably has a thickness of less than 100 μm and preferably less than 70 μm.

Thereafter, the current collector substrate coated with the electrode slurry is carried through a dryer/oven to remove the water and organic solvent from the coated electrode slurry as described relative to FIG. 1 in order to form an electrode sheet.

Figure 6:
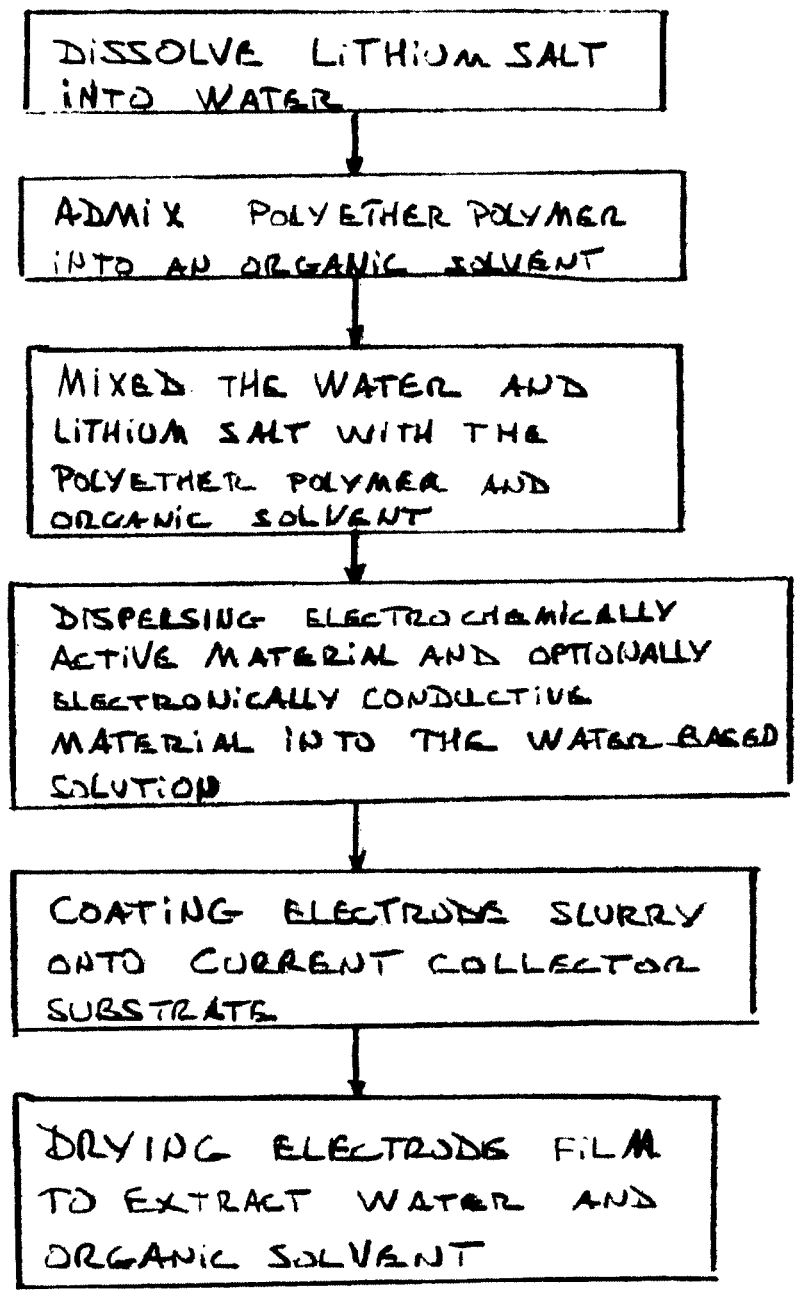
FIG. 6 is a flowchart illustrating a process method for preparing a thin film positive electrode for use in a lithium based electrochemical cell in accordance with a sixth embodiment of the present invention.

FIG. 6 is a flowchart illustrating a process for preparing an electrode thin sheet in accordance with a sixth embodiment of the present invention. First, a lithium salt is dissolved in water. Separately, a polyether polymer or copolymer capable of solvating lithium salt, preferably a polyethylene oxide polymer or co-polymer is mixed with an organic solvent miscible with water. Preferred organic solvents are enumerated above with reference to FIG. 2. Thereafter, the water solution containing lithium salt is mixed with the organic solvent and polyether polymer using a standard mechanical mixer to form an interim water-based solution. The water and organic solvent are mixed in a ratio of a minimum of 50% water by volume. In a preferred embodiment, water and organic solvent are mixed in a ratio of between 75% and 95% of water to between 25% and 5% organic solvent by volume. The polyether polymer is mixed with water and organic solvent in a ratio of 10% to 20% by weight.

The polyether polymer may be cross-linkable and a cross-linking additive may be used as described above in order to increase the dimensional stability of the formed electrode. The cross-linking additive is selected from the additives enumerated above relative to FIG. 1. Cross-linking of the polymer matrix is carried out thermally, by UV radiation or with an electron beam (EB).

The portion of organic solvent in the solution increases the solubility of the polyether polymer in the solution. The organic solvent has the effect of increasing the Low Critical Solubility Temperature (LCST) of the polymer thereby improving the ease of mixing and processing the constituents of the electrode and the resulting electrode slurry.

To prevent foaming, an antifoaming agent (silicone based or non-silicone based) may be added as described above and the mixing process may be carried out under vacuum in order to limit air contact with the solution during mixing.

Thereafter, the electrochemically active material and, if required an electronically conductive additive, is introduced into the water-based solution now including the solvent mix (water and organic solvent), the lithium salt and the polyethylene oxide, and the new mixture is mechanically mixed under vacuum until a homogeneous degassed final water-based solution/suspension in the form of a slurry is obtained. The electrochemically active materials used are described above with reference to FIG. 1.

In general terms, the slurry mixture contains by weight at least 40% solvent (water and organic solvent), at least 20% electrochemically active material, up to 10% electrically conductive material if required, at least 5% polyether polymer or copolymer, and at least 1.5% lithium salt.

After mixing (under vacuum and/or with antifoaming agent added), a homogeneous electrode slurry is obtained which is ready to be formed into a thin film. The homogeneous slurry is preferably spread or coated directly onto a current collector substrate. An aluminum based current collector substrate is typically used for the positive electrode and a copper based current collector substrate is typically used for the negative electrode. The spreading or coating of the homogeneous slurry is preferably carried out via Doctor blade, reverse roll, gravure roll, curtain, slide die, or slot die processes. The slurry may also be heated prior to coating to reduce its viscosity. The coated electrode thin film preferably has a thickness of less than 100 µm and preferably less than 70 µm.

Thereafter, the current collector substrate coated with the electrode slurry is carried through a dryer/oven to remove the water and organic solvent from the coated electrode slurry as described relative to FIG. 1 in order to form an electrode sheet.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. A process for making an electrode sheet for a lithium electrochemical cells comprising the steps of:
   a) admixing water, an organic solvent miscible with water in a water/organic solvent ratio of a maximum of 50% organic solvent by volume and a polyether polymer or copolymer soluble in water, and dissolving at least one lithium salt therein, to form an interim solution including constituents of an ionically conductive electrolyte consisting of the polymer or copolymer and the at least one lithium salt;
   b) dispersing at least one electrochemically active material and an electrically conductive material into the interim solution to form a solution/suspension containing by weight at least 40% of water/organic solvent mix; at least 20% electrochemically active material, at least 5% of a polyether polymer or copolymer, up to 10% weight electrically conductive material and at least 1.5% lithium salt;
   c) coating the solution/suspension in the form of an electrode thin film onto an electrode support; and,
   d) drying the electrode thin film to remove the water and organic solvent and obtain an electrode thin sheet having less than 1000 ppm of residual water.

2. A process for making an electrode sheet as defined in claim 1, wherein the organic solvent is miscible with water and is mixed with water in a ratio of a maximum of 25% volume of organic solvent.

3. A process for making an electrode sheet as defined in claim 1, wherein the electrode thin sheet has less than 10% volume porosity after being dried.

4. A process for making an electrode sheet as defined in claim 1, wherein the electrode thin sheet has less than 5% volume porosity after being dried.

5. A process for making an electrode sheet as defined in claim 1, wherein the water is selected from the group of distilled, purified and deionized water.

6. A process for making an electrode sheet as defined in claim 5 wherein the water, one or more organic solvent and the polyether polymer or copolymer are first mixed together to form an initial solution.

7. A process for making an electrode sheet as defined in claim 6 wherein the lithium salt is dissolved in the initial solution to form the interim solution.

8. A process for making an electrode sheet as defined in claim 7 wherein the at least one electrochemically active material is admixed into the interim solution to form the solution/suspension.

9. A process for making an electrode sheet as defined in claim 1, wherein the organic solvent is selected from the group consisting of an alcohol, a mixture of alcohols, a ketone, a mixture of ketones, a mixture of alcohol and ketone and a mixture of alcohols and ketones.

10. A process for making an electrode sheet as defined in claim 9, wherein the alcohol is selected from the group consisting of ethanol, methanol and isopropanol.

11. A process for making an electrode sheet as defined in claim 9, wherein the ketone is selected from the group consisting of acetone and Methyl Ethyl Ketone.

12. A process for making an electrode sheet as defined in claim 9 wherein the one or more organic solvent is first mixed with the water to form an initial solution.

13. A process for making an electrode sheet as defined in claim 12 wherein the lithium salt is dissolved in the initial solution.

14. A process for making an electrode sheet as defined in claim 13 wherein the polyether polymer or copolymer is admixed into the initial solution to form an the interim solution.

15. A process for making an electrode sheet as defined in claim 9 wherein the lithium salt is first dissolved in one or more organic solvent to form an initial solution.

16. A process for making an electrode sheet as defined in claim 15 wherein water is mixed with the initial solution.

17. A process for making an electrode sheet as defined in claim 16 wherein the polyether polymer or copolymer is admixed into the initial solution to form the interim solution.

18. A process for making an electrode sheet as defined in claim 17 wherein the at least one electrochemically active material is admixed into the interim solution to form the solution/suspension.

19. A process for making an electrode sheet as defined in claim 1 wherein the at least one lithium salt is selected from the group consisting of LiTFSI, TFSI, FSI, BETI, LiBOB, LiBF4, and LiClO4.

20. A process for making an electrode sheet as defined in claim 1 wherein the electrochemically active material is selected from the group consisting of electrochemically active material having the general formulas of LiFePO4, LiCoO2, LiNiO2, LiMn2O4, Li4Ti5O12, and their derivatives.

21. A process for making an electrode sheet as defined in claim 1 further comprising the step of admixing an antifoaming agent into the solution/suspension.

22. A process for making an electrode sheet as defined in claim 1 wherein the lithium salt is first dissolved in the water to form an initial solution.

23. A process for making an electrode sheet as defined in claim 22 wherein the polyether polymer or copolymer is admixed into the initial solution to form the interim solution.

24. A process for making an electrode sheet as defined in claim 23 wherein the at least one electrochemically active material is admixed into the interim solution to form the solution/suspension.

25. A process for making an electrode sheet as defined in claim 22 wherein one or more organic solvent is mixed with the water to form the initial solution.

26. A process for making an electrode sheet as defined in claim 25 wherein the polyether polymer or copolymer is admixed into the initial solution to form the interim solution.

27. A process for making an electrode sheet as defined in claim 26 wherein the at least one electrochemically active material is admixed into the interim solution to form the solution/suspension.

28. A process for making an electrode sheet as defined in claim 1 wherein the admixing process is carried out under vacuum.

29. A process for making an electrode sheet as defined in claim 1 wherein the drying step is carried out by thermal means or by infra red.

30. A process for making an electrode sheet as defined in claim 29 wherein the drying step is carried out through multiple incremental drying stages.

31. A process for making an electrode sheet as defined in claim 30 wherein the electrode thin film travels through a dryer/oven consisting of a tunnel having incremental drying zones ranging from 50° C. to 200° C.

32. A process for making an electrode sheet as defined in claim 1 wherein the polyether polymer or copolymer is capable of solvating a lithium salt.

33. A process for making an electrode sheet as defined in claim 1 wherein the polyether polymer or copolymer is cross-linkable.

* * * * *